(12) United States Patent
Kumar et al.

(10) Patent No.: US 11,341,250 B2
(45) Date of Patent: May 24, 2022

(54) SYSTEM AND METHOD TO SECURELY MAP UEFI RAMDISK USING DMAR TABLE FOR SECURELY LAUNCHING SOS CONTENTS

(71) Applicant: Dell Products L.P., Round Rock, TX (US)

(72) Inventors: Shubham Kumar, Chakradharpur (IN); Sumanth Vidyadhara, Bangalore (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 501 days.

(21) Appl. No.: 16/571,802

(22) Filed: Sep. 16, 2019

(65) Prior Publication Data

US 2021/0081534 A1    Mar. 18, 2021

(51) Int. Cl.
| | |
|---|---|
| G06F 21/57 | (2013.01) |
| G06F 9/4401 | (2018.01) |
| G06F 9/50 | (2006.01) |
| G06F 13/20 | (2006.01) |
| G06F 13/42 | (2006.01) |
| G06F 15/173 | (2006.01) |

(52) U.S. Cl.
CPC .......... G06F 21/575 (2013.01); G06F 9/4403 (2013.01); G06F 9/5016 (2013.01); G06F 13/20 (2013.01); G06F 13/4221 (2013.01); G06F 13/4282 (2013.01); G06F 15/17331 (2013.01); G06F 21/572 (2013.01); *G06F 2213/0024* (2013.01); *G06F 2213/0026* (2013.01)

(58) Field of Classification Search
CPC ........................... G06F 15/177; G06Q 10/0631
See application file for complete search history.

(56) References Cited

PUBLICATIONS

Yao, Jiewen and Zimmer, Vincent J., A Tour beyong BIOS Using Intel VT-d for DMA Protection in UEFI BIOS, White Paper, Intel Corporation, Jan. 2015.
Morgan, B. et al., Bypassing IOMMU Protection against I/O Attacks, 7th Latin-American Symposium on Dependable Computing (LADC'16), Oct. 2016, Cali, Colombia, pp. 145-150, 10.1109/LADC.2016.31.

*Primary Examiner* — Getente A Yimer
(74) *Attorney, Agent, or Firm* — Jackson Walker L.L.P.

(57) ABSTRACT

An information handling system may include a processor, a network interface, and a basic input/output system (BIOS) configured to execute a pre-boot environment. The information handling system may be configured to: during execution of the pre-boot environment, establish a pre-boot network connection to a remote information handling system via the network interface; receive operating system data from the remote information handling system; create a pseudo-device at a specified address of the information handling system; perform direct memory access (DMA) remapping between the pseudo-device and an address range of memory of the information handling system to create a ram disk; and based on the operating system data received from the remote information handling system, initialize an operating system on the ram disk via the specified address of the pseudo-device.

20 Claims, 8 Drawing Sheets

SYSTEM AND METHOD TO SECURELY MAP UEFI RAMDISK USING DMAR TABLE FOR SECURELY LAUNCHING SOS CONTENTS

TECHNICAL FIELD

The present disclosure relates in general to information handling systems, and more particularly to securely booting an operating system from a ram disk.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ram disks are sometimes used to allocate a certain amount of memory in the physical address space (e.g., RAM) of an information handling system during the pre-boot stage. This space may be used to store data or files during the pre-boot stage. Such an implementation, however, is prone to attacks on the RAM by whatever code is being stored in the ram disk. That code may thus access a restricted area of RAM, which it is not authorized to access. Since the ram disk driver typically does not check for such malicious accesses, it can be difficult to recognize and prevent such accesses in the pre-boot stage.

Accordingly, the system may be vulnerable to direct memory access (DMA) attacks while the firmware is being executed, because the firmware does not filter DMA accesses. This vulnerability may be exploited by malicious code running in the traditional ram disk space to modify the firmware itself and bypass the protection of the input-output memory management unit (IOMMU).

Accordingly, embodiments of this disclosure may use a pseudo-device (e.g., a pseudo ram disk device in the PCIe subsystem) to remap the addresses and allow a DMA remapping unit to handle access requests. In this way, unauthorized access requests may be automatically trapped and prevented.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with securely booting an operating system from a ram disk may be reduced or eliminated.

In accordance with embodiments of the present disclosure, an information handling system may include a processor, a network interface, and a basic input/output system (BIOS) configured to execute a pre-boot environment. The information handling system may be configured to: during execution of the pre-boot environment, establish a pre-boot network connection to a remote information handling system via the network interface; receive operating system data from the remote information handling system; create a pseudo-device at a specified address of the information handling system; perform direct memory access (DMA) remapping between the pseudo-device and an address range of memory of the information handling system to create a ram disk; and based on the operating system data received from the remote information handling system, initialize an operating system on the ram disk via the specified address of the pseudo-device.

In accordance with these and other embodiments of the present disclosure, a method may include: during execution of a pre-boot environment of an information handling system by a basic input/output system (BIOS) of the information handling system, establishing a pre-boot network connection to a remote information handling system via a network interface; receiving operating system data from the remote information handling system; creating a pseudo-device at a specified address of the information handling system; performing direct memory access (DMA) remapping between the pseudo-device and an address range of memory of the information handling system to create a ram disk; and based on the operating system data received from the remote information handling system, initializing an operating system on the ram disk via the specified address of the pseudo-device.

In accordance with these and other embodiments of the present disclosure, an article of manufacture may include a non-transitory, computer-readable medium having computer-executable code thereon that is executable by a processor of an information handling system for: during execution of a pre-boot environment of an information handling system by a basic input/output system (BIOS) of the information handling system, establishing a pre-boot network connection to a remote information handling system via a network interface; receiving operating system data from the remote information handling system; creating a pseudo-device at a specified address of the information handling system; performing direct memory access (DMA) remapping between the pseudo-device and an address range of memory of the information handling system to create a ram disk; and based on the operating system data received from the remote information handling system, initializing an operating system on the ram disk via the specified address of the pseudo-device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
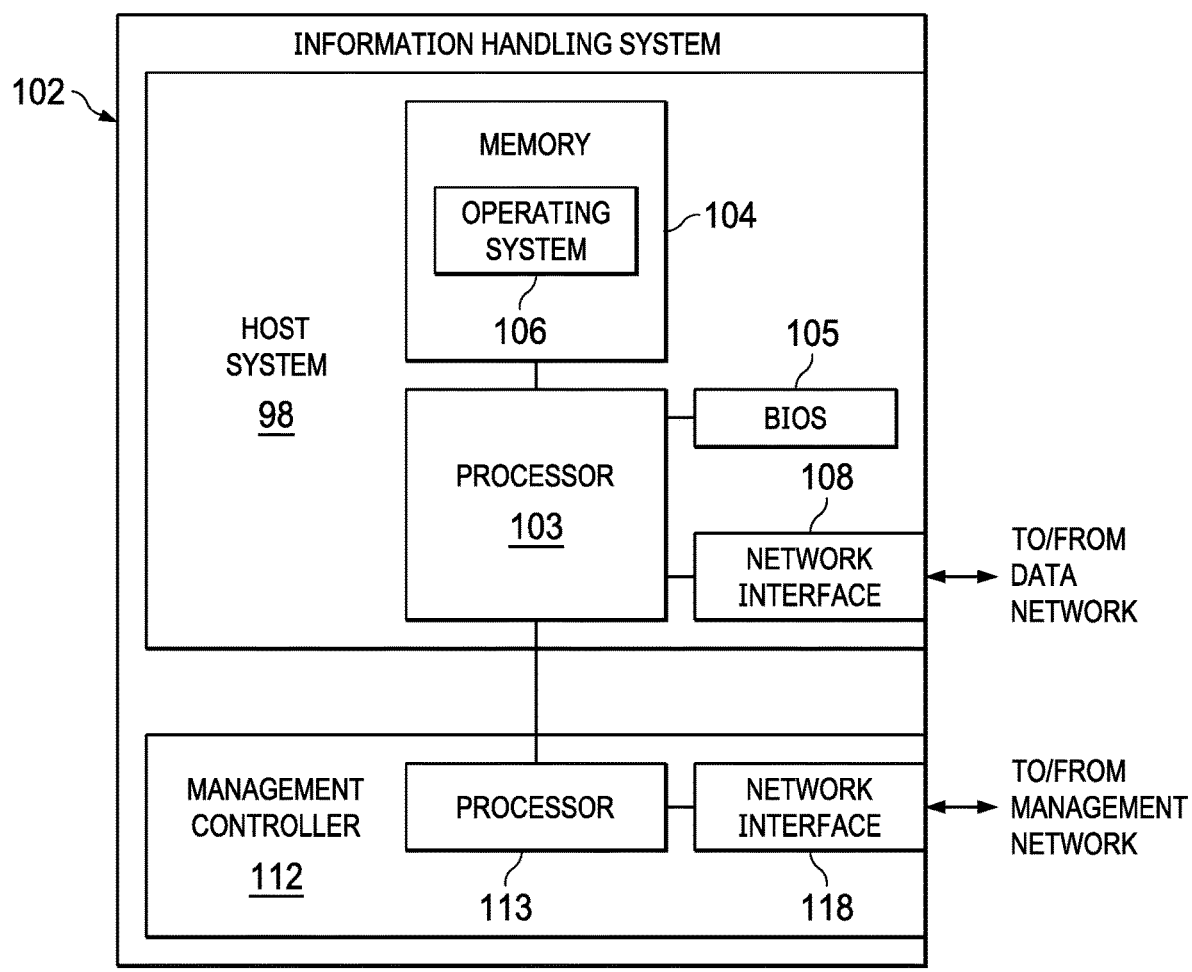
FIG. 1 illustrates a block diagram of an example information handling system, in accordance with embodiments of the present disclosure.

Preferred embodiments and their advantages are best understood by reference to FIGS. 1 through 7, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As noted above, a memory protection issue may sometimes arise in the pre-boot phase of an information handling system, before an operating system has been initialized. For example, it may sometimes be desirable to download a service operating system (SOS) from a remote information handling system (e.g., if the primary operating system is in a non-bootable state and needs to be repaired). Accordingly, a trusted session to a remote information handling system may be established over a pre-boot network connection app (e.g., Dell BIOSConnect) to download such operating system data for execution via a ram disk.

Figure 2A:
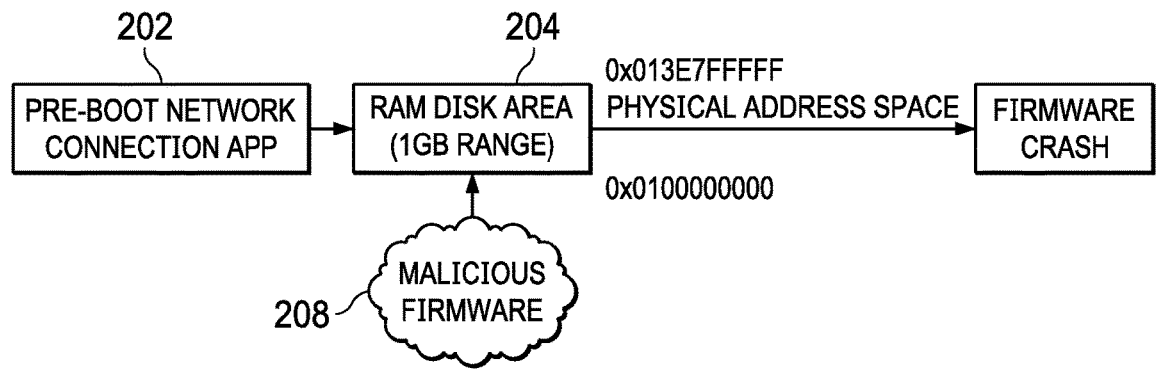
FIG. 2A illustrates a block diagram of a problematic access request.

FIG. 2A illustrates a memory protection problem in existing systems. Pre-boot network connection app 202 downloads operating system data (e.g., an SOS image) and executes the code in a portion of memory established as ram disk area 204. In this example, 1 GB of storage has been set aside for the ram disk, at the physical address range 0x0100000000-0x013E7FFFFF. If a malicious firmware component attempts to access that memory range directly, the access may be allowed, causing a firmware crash or other undesired behavior.

Figure 2B:
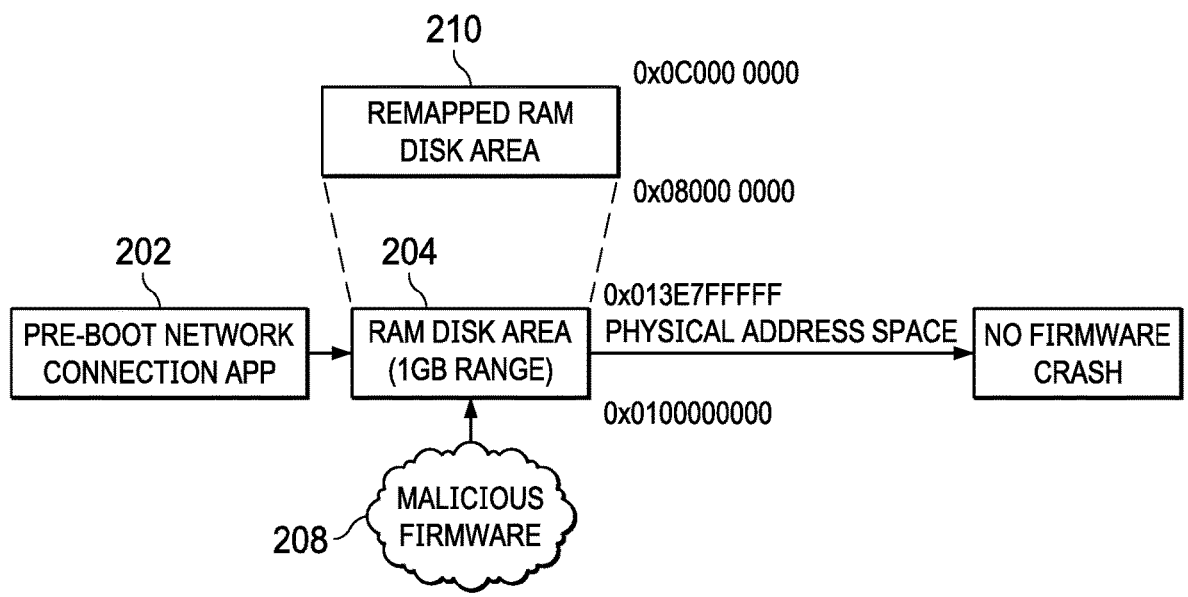
FIG. 2B illustrates a block diagram of preventing a problematic access request, in accordance with embodiments of the present disclosure.

FIG. 2B illustrates a solution, in accordance with some embodiments of this disclosure. The physical address space of ram disk area 204 has been remapped to remapped ram disk area 210, which may reside, in this example, at address range 0x080000000-0x000000000. This is a level of indirection that may be implemented via a DMA remapping table (DMAR table). The malicious firmware component may be unable to access the remapped address range, as the physical addresses may be unknown and may change at runtime (e.g., randomly or pseudo-randomly). Further, unauthorized access may be prevented via additional mechanisms as discussed in more detail below.

To this end, in some embodiments, a pseudo ram disk device may be created (e.g., as a Peripheral Component Interconnect Express (PCIe) device). Virtualization technologies (such as Intel VT-d) may provide a DMA remapping unit which may be used to implement the indirection layer mentioned above.

As per the Intel VT-d specification, for example, every DMA remapping unit may have a DMA remapping hardware unit definition (DRHD) structure associated with it. Each DRHD may have under its scope some set of PCIe devices located at specific addresses (e.g., (bus:device:function addresses).

A UEFI BIOS may report the remapped hardware units to system software through an Advanced Configuration and Power Interface (ACPI) table such as the DMAR ACPI table. The operating system may refer to this ACPI table to know which PCIe device is managed by which DRHD. With DMA remapping and translation enabled in the pre-boot stage, the attacks on physical memory by any malicious code in the ram disk may be prevented in a similar way to the manner in which the physical memory is protected against DMA attacks.

In some embodiments, a PCIe-based pseudo ram disk device may be part of one such DRHD unit, which may prevent any malicious program executing in this device from accessing unintended memory addresses.

Figure 4:
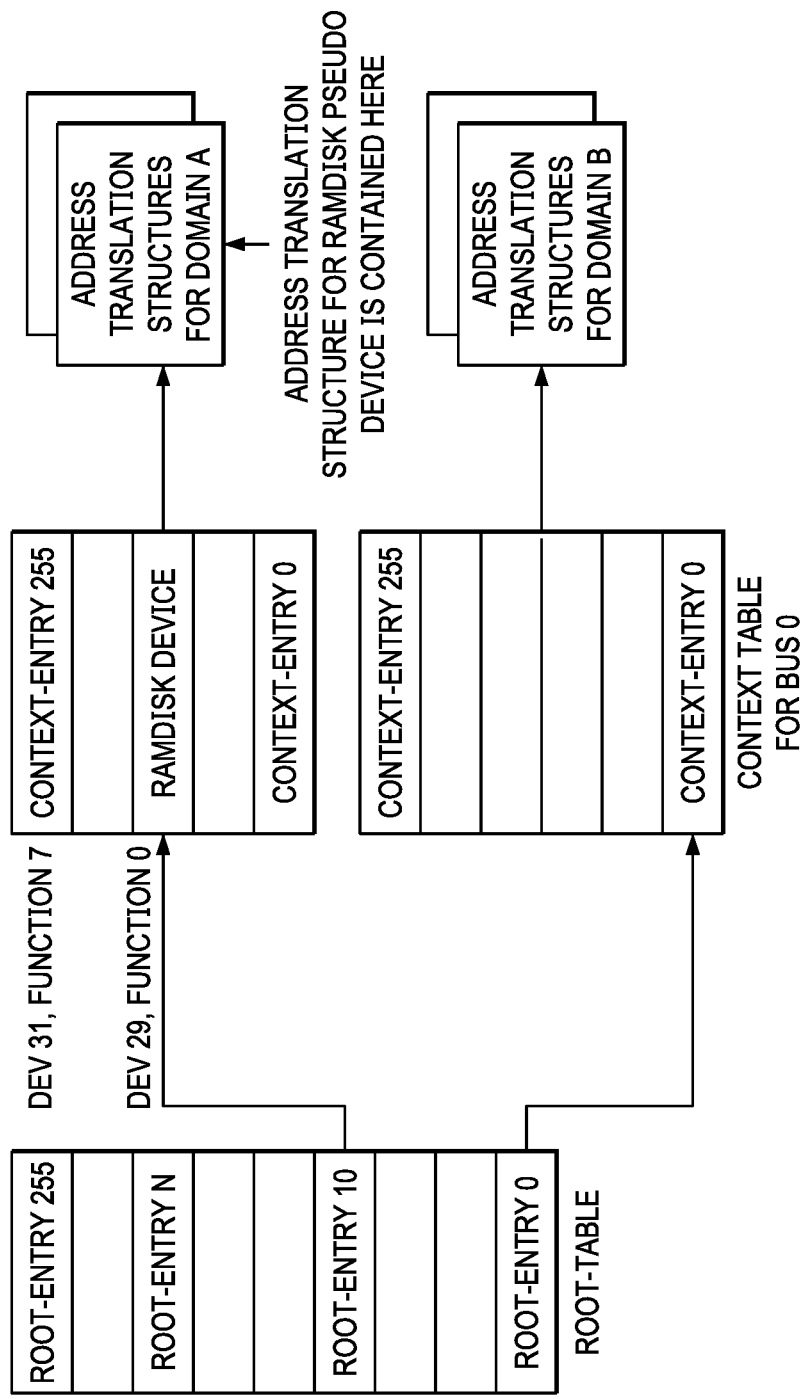
FIG. 4 illustrates additional details of a portion of the embodiment of FIG. 3.

In some embodiments, the protection mechanism for I/O devices using the DMAR table may operate as follows. IOMMUs may translate and filter requests according to the protection domain assigned to the requesting device. A protection domain may be considered as a set of translation policies. The process may be divided in two phases. The first phase identifies the protection domain assigned to the emitter device. This phase, called device-to-domain mapping, is somewhat similar conceptually to an address translation; but instead, it associates PCI/PCIe identifiers to address translation domains. In the second phase, called address translation, the addresses used by peripheral memory accesses may be translated by the DMA remapping units, before crossing the host bridge. This translation is somewhat similar to the one made by a CPU core's memory management unit (MMU). Access controls are applicable in the two translation phases. FIG. 4, discussed below, provides additional details.

At a high level, embodiments of this disclosure may operate as follows. First, during the pre-boot phase, the BIOS may create a pseudo ram disk device in the PCIe subsystem. This device may be mapped to a range of memory in the physical address space. This range of memory may be available in the DMAR table. This device may then be used to download and save any content needed in the pre-boot stage (e.g., when the primary operating system is corrupted, and a service operating system is needed for repairs).

In some embodiments, a ram disk may be created in GPU memory. The BIOS may create a DMAR table for the ram disk, and it may store all the contents of the SOS files in this ram disk. The BIOS may also create a UEFI variable describing the ram disk DMAR virtual address and size. The DMAR mapping may be stored in an ACPI table. Further, in some embodiments, once the OS (or SOS) boots and reads the ACPI table regarding the location of the ram disk virtual address and size, it may use the same DMAR table unchanged. The OS may copy its contents locally, ensuring that no malicious contents are copied and stored before the SOS boots. Thus a PCIe-based pseudo storage device may make use of existing virtualization technology to protect the RAM from attacks. In some embodiments, the OS may protect kernel data structures by parsing the DMAR table, setting a DMA translation according to the OS, and enabling DMA remapping again.

This solution may help in overcoming various problems. For example, it may provide secure mapping of PCIe-based GPU memory for ram disk creation and loading all SOS contents on this memory with all the ram disk address mapping stored in a DMAR table and handed down to the SOS by an ACPI table. Malicious code thus may be unable to access the ram disk in GPU memory, as the addresses are not accessible by other consumers. (For example, consider the case in which the BootX64.efi program itself may be malicious. This implementation may prevent access by this malicious program to the ram disk, because the DMA remapping hardware unit will handle such malicious access requests and deny them.)

As another example, there may be chunks of non-contiguous memory in RAM to be used for an application. It may be challenging to allocate a large contiguous pool for a ram disk. With embodiments of this disclosure, the contiguous memory demand can be fulfilled using the GPU memory.

As yet another example, the SOS may reuse the same DMAR mapping done in UEFI for safely copying the contents from the UEFI ram disk to the local filesystem, so that the data is essentially tamper-proof.

Figure 3:
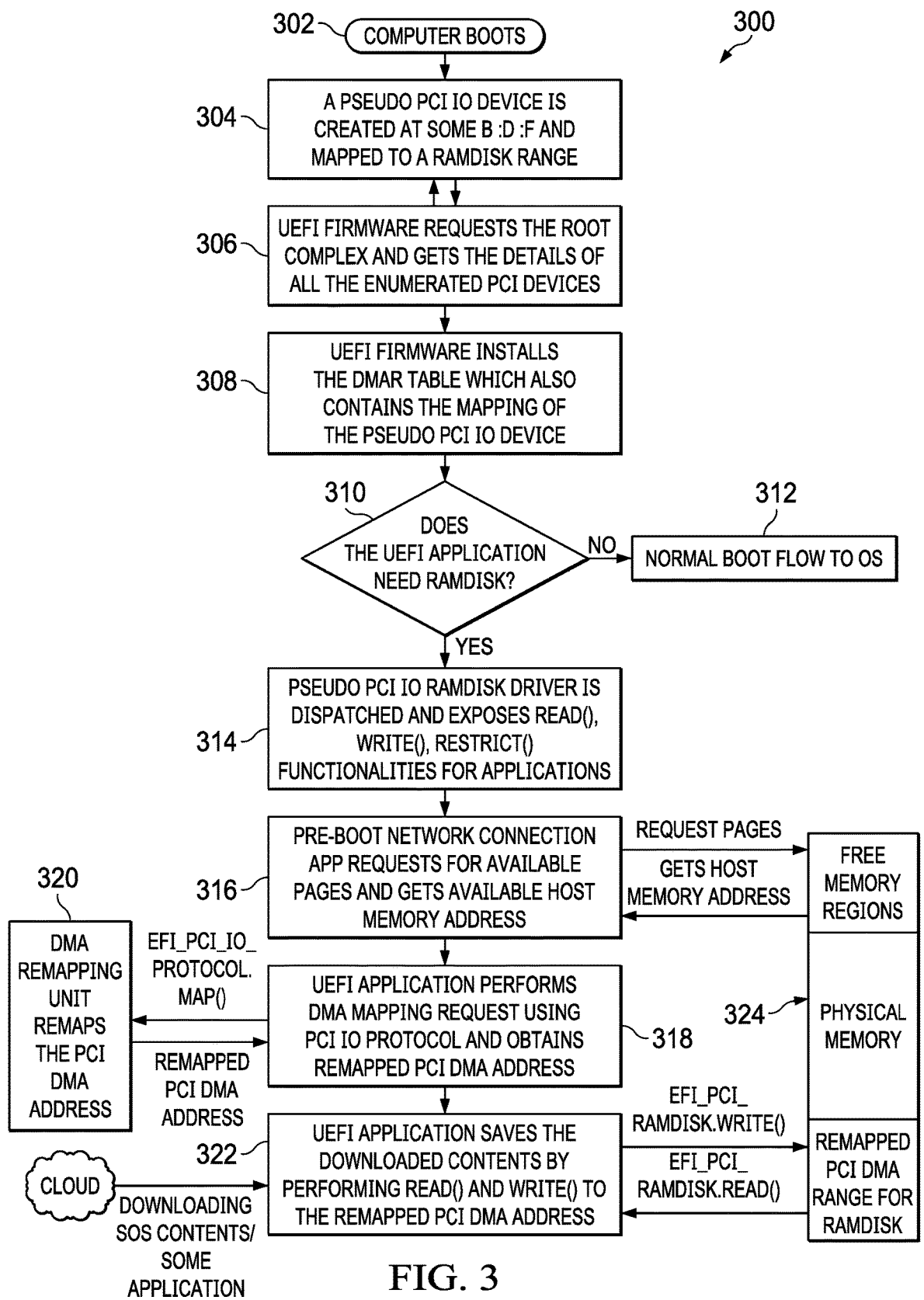
FIG. 3 illustrates an example flow diagram of a method, in accordance with embodiments of the present disclosure.

Turning now to FIG. 3, a flow chart is shown of an example method 300. Generally, steps 302 through 308 show an embodiment of creating a pseudo device. Steps 310 through 322 show the use of a remapped ram disk range for downloaded software components.

At step 302, the computer begins the boot process. At step 304 (e.g., during the pre-boot phase), a pseudo PCI I/O device is created at a selected bus:device:function address, and is mapped onto an address range of a ram disk. (Further details about this step are provided below with regard to FIG. 4.)

At step 306, the UEFI firmware may make a request to the PCI root complex and get details about all of the enumerated PCI devices. At step 308, the UEFI firmware may install a DMA remapping table containing the mapping of the pseudo PCI device to the ram disk address range.

At step 310, the boot process may determine whether or not the ram disk is needed. If not, normal boot flow to the primary OS continues at step 312 and is not discussed further.

If the ram disk is needed, however, flow proceeds to step 314. At step 314, a pseudo PCI I/O ram disk driver is dispatched, exposing methods such as Read( ), Write( ), and Restrict( ) usable by applications. (Further details about this step are provided below with regard to FIG. 5.)

At step 316, the pre-boot network connection app may request available memory pages and receive an available host memory address from physical memory 324.

At step 318, the pre-boot network connection app may perform a DMA remapping request (e.g., using a PCI I/O protocol) and obtain the remapped PCI DMA address. At step 320, the DMA remapping unit may remap the PCI DMA address and return the result to the pre-boot network connection app.

At step 322, the pre-boot network connection app may download SOS file(s) or an SOS image. This download may include any applications needed for recovering the primary OS, and it may be saved to the remapped PCI DMA range by performing Read( ) and Write( ) functions.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

Turning now to FIG. 4, additional details about the functionality of step 304 of FIG. 3 are provided. For example, in this embodiment, assume that the bus:device: function address for the pseudo ram disk device is 10:29:0. In that case, the device-to-domain mapping structure using the root table may be as depicted in FIG. 4. In other embodiments, multiple such pseudo ram disk devices may be created and mapped in a similar way, as one of ordinary skill in the art with the benefit of this disclosure will understand.

In general, the address translation structure may essentially be a second-level page table. This second-level page table may be similar in some respects to the page table of a CPU. Some differences may be present, however, such as the use of different flag bits. For example, in the case of a VT-d second-level page table, bits such as X (execution), W (write), and R (read) may be used; whereas in the case of a CPU page table, the bits would typically be XD (executable), RW (read/write), and P (present).

The translation process as shown in FIG. 4 may include first parsing the root table and the context table, and then parsing the second level page table.

Figure 5:
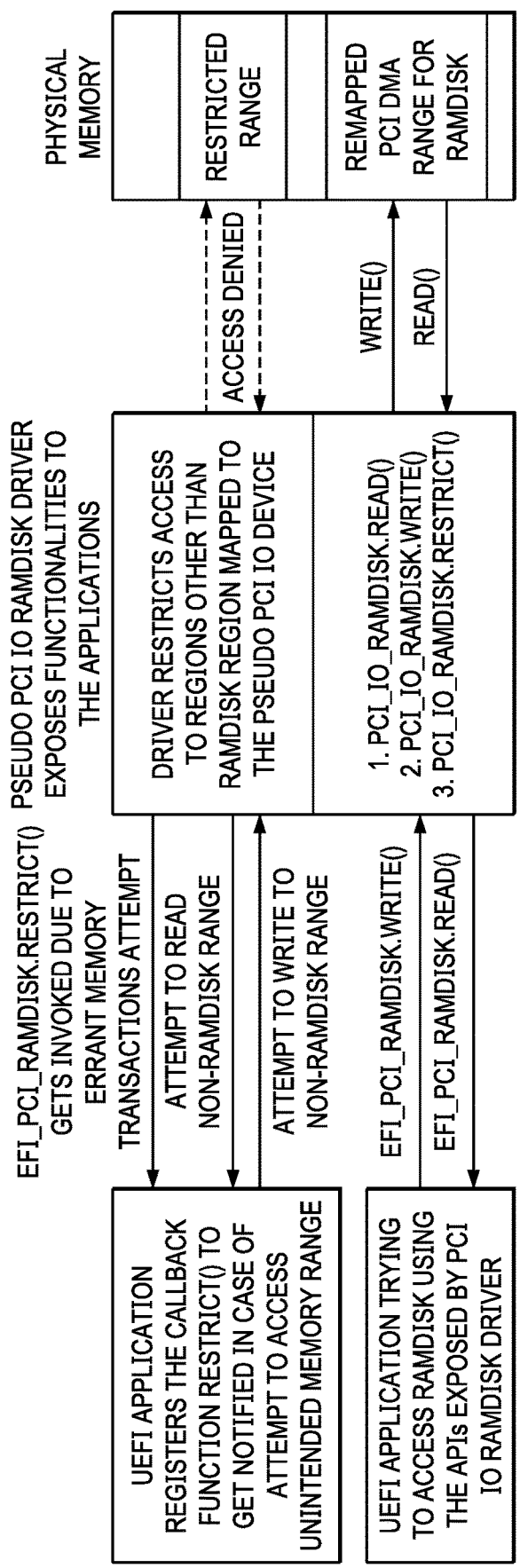
FIG. 5 illustrates additional details of another portion of the embodiment of FIG. 3.

Turning now to FIG. 5, additional details about the functionality of step 314 of FIG. 3 are provided. In general, the pseudo PCI I/O ram disk driver exposes functionality to UEFI applications, allowing some transactions and preventing others. For example, the driver may expose functions such as PCI_IO_RAMDISK_Read( ), PCI_IO_RAMDISK_Write( ), and PCI_IO_RAMDISK_Restrict( ). Reads and writes to the ram disk using this API are passed through to the remapped address range and succeed. Reads and writes to other address ranges fail (e.g., with an access denied error).

In addition, a UEFI application can register a callback Restrict( ) function in order to be notified of any failed attempts to access restricted address space.

Figure 6:
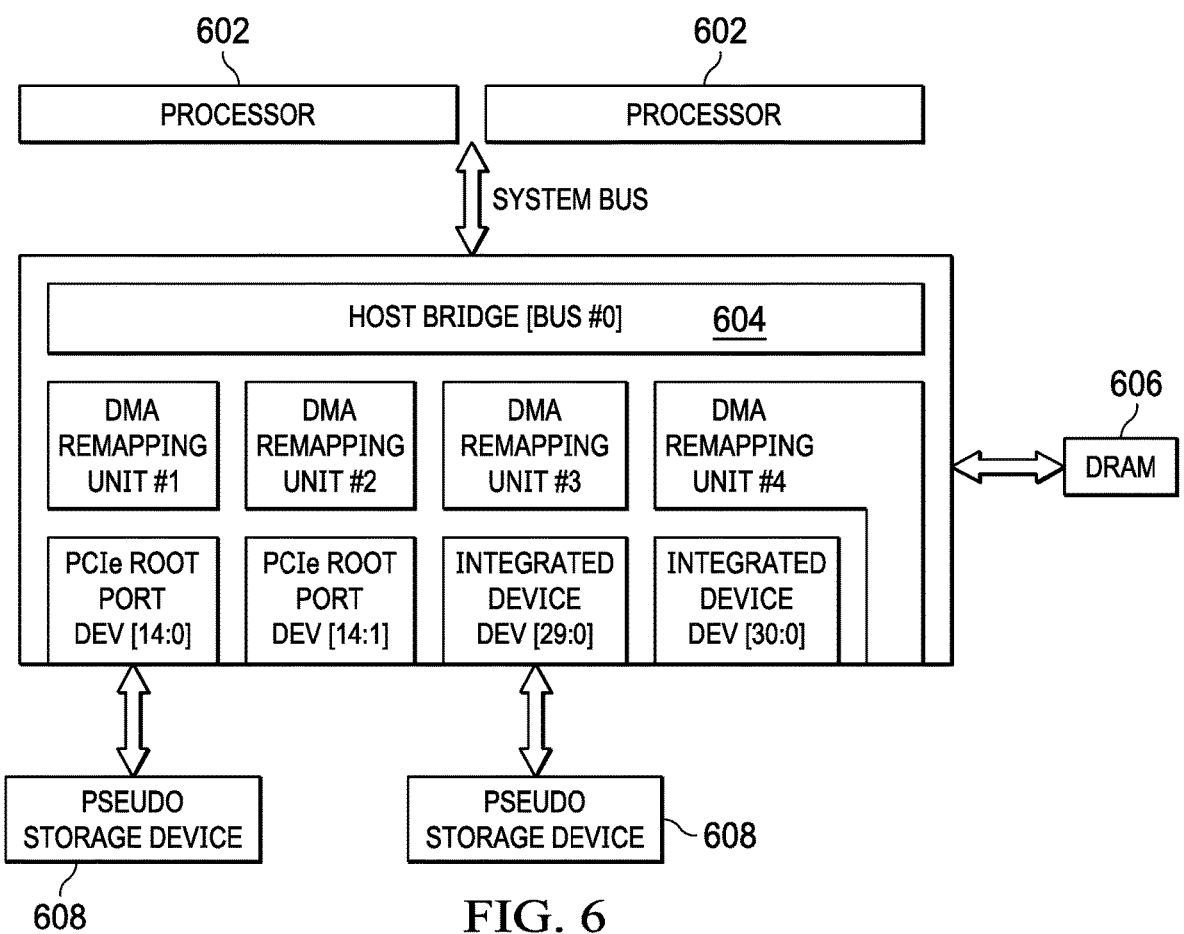
FIG. 6 illustrates a block diagram of an example system, in accordance with embodiments of the present disclosure.

Turning now to FIG. 6, a block diagram of a system architecture in accordance with some embodiments is shown. Host bridge 604 implements a plurality of DMA remapping units coupling pseudo storage devices 608 to physical DRAM 606 for access by processors 602.

Figure 7A:
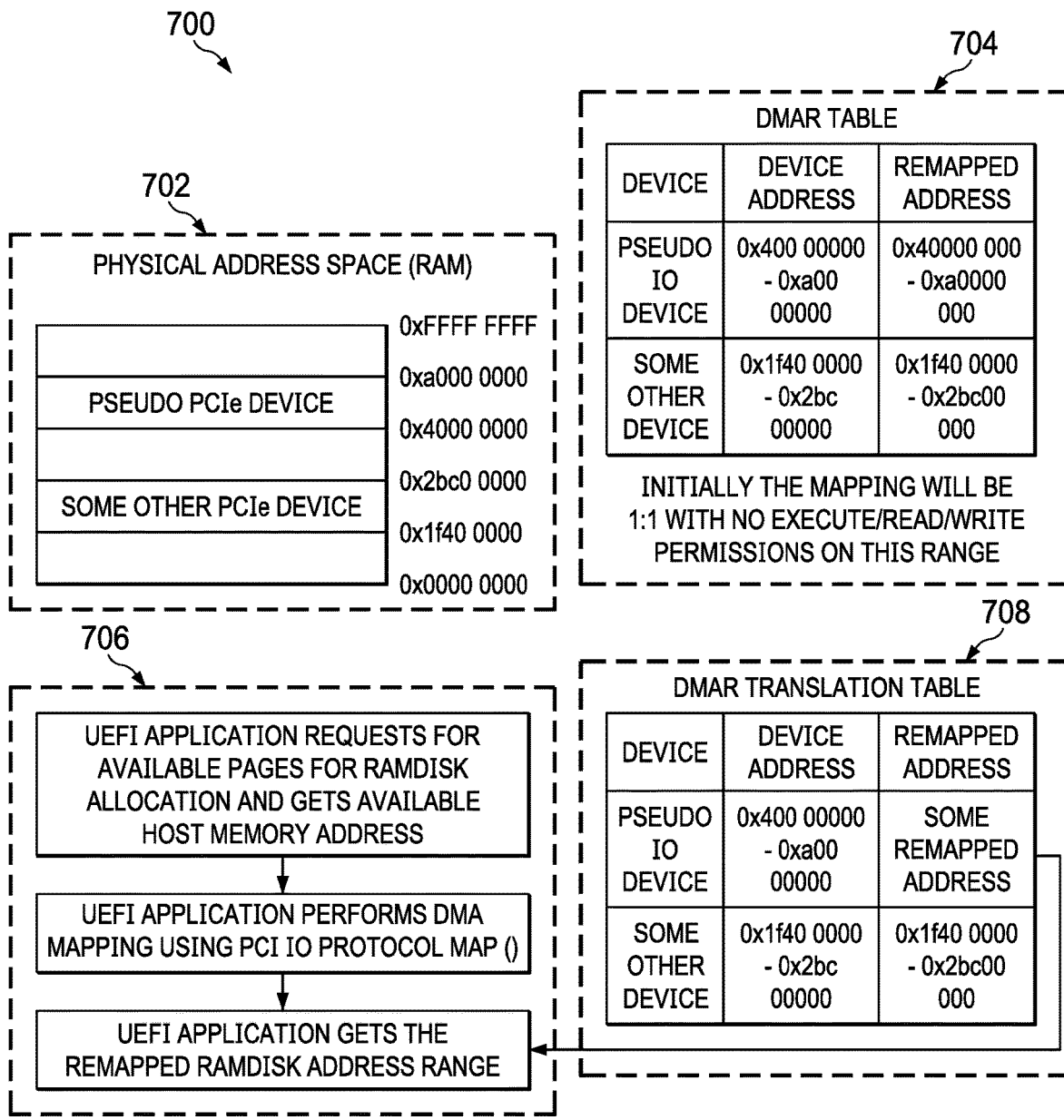
FIGS. 7A and 7B (referred to collectively herein as FIG. 7) illustrate an example flow diagram of a method, in accordance with embodiments of the present disclosure.
Figure 7B:
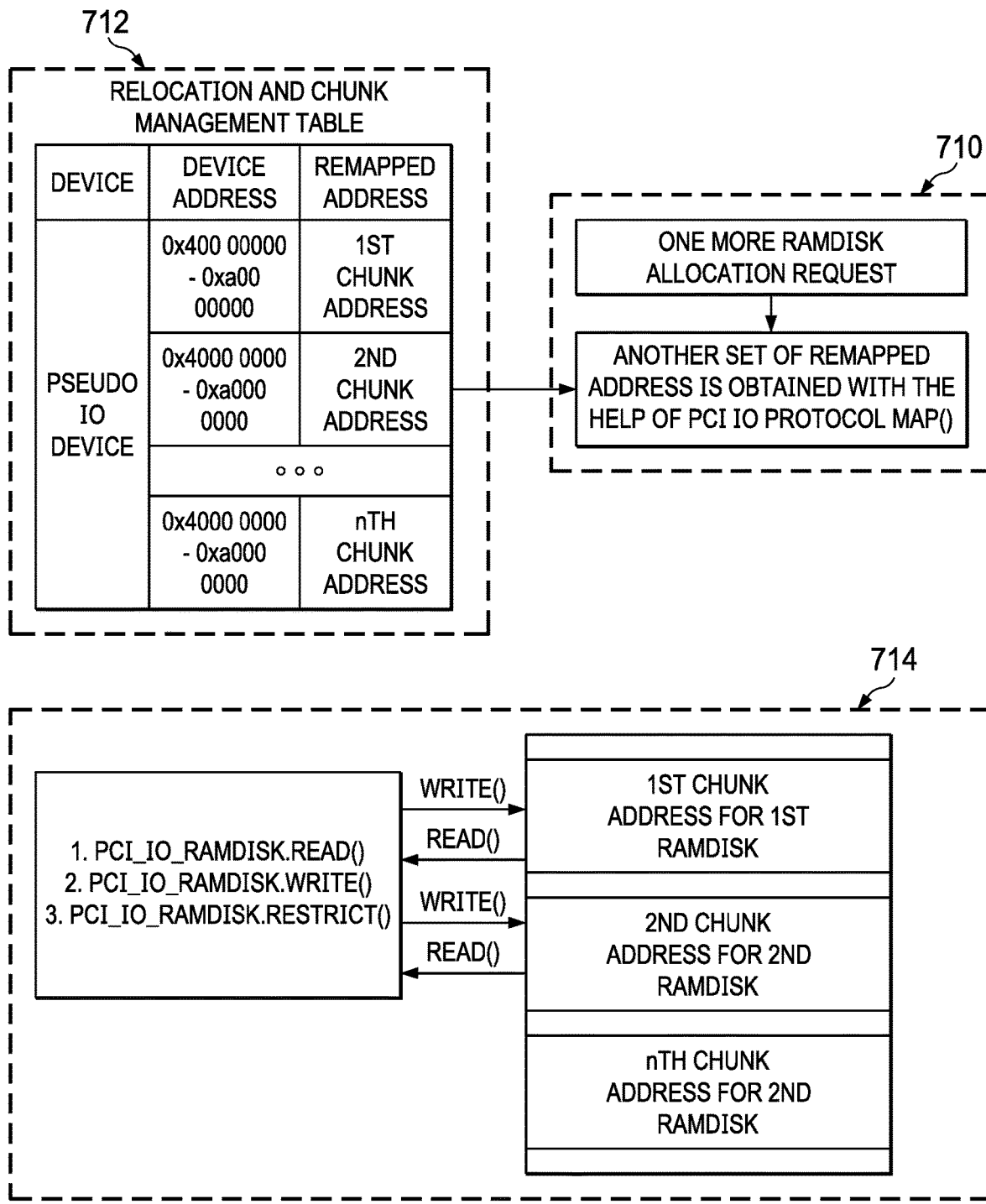

Turning now to FIG. 7, a flow chart is shown of an example method 700. FIG. 7 includes example hexadecimal addresses for the sake of concreteness and ease of explanation.

At step 702, the PCIe devices of an information handling system are enumerated. As shown, the enumeration may include one or more pseudo PCIe devices.

At step 704, after device enumeration is finished (e.g., at the END_OF_DXE event) a DMAR table is configured. Initially, the mapping in the DMAR table will be 1:1, with the pseudo device address mapped directly onto the same physical address, and with no execute/read/write privileges on the address range for the pseudo device.

At step 706, a UEFI application (e.g., a pre-boot network connection application) initiates a request for DMA mapping. The DMAR table is accessed, and the host address is mapped to the PCI DMA address.

At step 708, the DMAR table is updated after the pseudo PCI device DMA mapping request is received from the UEFI application. In particular, the pseudo device is now mapped onto a different remapped address.

At step 710, an additional ram disk allocation request is received. Another set of remapped addresses is correspondingly obtained.

At step 712, a relocation chunk management table is formed to keep track of the mappings for all of the ram disk requests.

Finally, at step 714, whenever the pseudo PCIe driver receives a Read( ) or Write( ) request for the remapped ram disk address ranges, it allows those requests to be serviced.

One of ordinary skill in the art with the benefit of this disclosure will understand that the preferred initialization point for the method depicted in FIG. 7 and the order of the steps comprising that method may depend on the implementation chosen. In these and other embodiments, this method may be implemented as hardware, firmware, software, applications, functions, libraries, or other instructions. Further, although FIG. 7 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

Embodiments of this disclosure may provide many benefits. For example, the use of existing virtualization technology provides a hardware-based solution that may not be possible in pure software.

Existing solutions do not address vulnerabilities caused present within a downloaded service operating system, which can execute within a ram disk to corrupt the firmware as well other mapped memory. Embodiments of this disclosure protect not only the ram disk contents, but the vulnerable firmware downloaded as well, because the payload does not have access to the I/O device mapping created by the pseudo device. Accordingly, the contents of RAM may be highly difficult to corrupt.

The creation of an I/O device mapping for the pseudo device is a unique UEFI method. The mapping using the DMAR table is treated as an I/O, and the OS remapping may also be protected dynamically.

In existing systems, ram disk address ranges are typically easily visible using a basic memory dump utility. With exposed ram disk ranges before and after ram disk creation, the system becomes vulnerable to attacks by unknown firmware which can directly read the memory layout and attack the ram disk address ranges. In embodiments of this disclosure, the malicious firmware may not be able to find out where the ram disk has been re-mapped by the pseudo driver. Further, even if the malicious firmware does somehow find out where it has been mapped, it will still not be able to perform DMA directly to that range, as the remap over the IOMMU will prevent such access.

Remapped memory is protected from malicious devices that are attempting DMA attacks and faulty devices that are attempting errant memory transfers, because a device cannot read or write to memory that has not been explicitly allocated (re-mapped) for it. The memory protection is based on the fact that an OS running on the CPU exclusively controls both the MMU and the IOMMU. The pseudo device managed memory cannot be physically circumvented or corrupted as it is configured with memory management tables. Further, UEFI drivers must use I/O abstractions to set up and complete DMA transactions when the ram disk has been mapped to a pseudo I/O device.

Embodiments of this disclosure are dynamic in terms of protecting the range of I/O mapping generated over RAM. For example, an address range of the pseudo device is created with I/O mappings which can protect or hide the mapped address and range. Only the pseudo driver has access to the mapping details.

Additionally, there are no solutions today to address the corruption of ram disk variables during the handover to a service OS for a failsafe boot. Also the copy from source (UEFI device) to destination (SOS location) is securely handled in some embodiments.

This disclosure thus may ensure that the boot from BIOS to launch of the SOS is secure. Further, as the device memory is used for ram disk, this may allow a faster boot of the SOS.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a processor;
    a network interface; and
    a basic input/output system (BIOS) configured to execute a pre-boot environment;
    wherein the information handling system is configured to:
        during execution of the pre-boot environment, establish a pre-boot network connection to a remote information handling system via the network interface;
        receive operating system data from the remote information handling system;
        create a pseudo-device at a specified address of the information handling system;
        perform direct memory access (DMA) remapping between the pseudo-device and an address range of memory of the information handling system to create a ram disk; and
        based on the operating system data received from the remote information handling system, initialize an operating system on the ram disk via the specified address of the pseudo-device.

2. The information handling system of claim 1, wherein the BIOS is a Unified Extensible Firmware Interface (UEFI) BIOS.

3. The information handling system of claim 1, wherein the operating system is a service operating system (SOS).

4. The information handling system of claim 1, wherein the pseudo-device is a Peripheral Component Interconnect (PCI) or Peripheral Component Interconnect Express (PCIe) pseudo-device.

5. The information handling system of claim 4, wherein the address for the pseudo-device is a bus:device:function address.

6. The information handling system of claim 5, wherein the address range of the memory of the information handling system is a physical address range.

7. The information handling system of claim 1, wherein the operating system data is a bootable disk image.

8. The information handling system of claim 1, wherein the DMA remapping is performed via an Advanced Configuration and Power Interface (ACPI) table.

9. A method comprising:
    during execution of a pre-boot environment of an information handling system by a basic input/output system (BIOS) of the information handling system, establishing a pre-boot network connection to a remote information handling system via a network interface;
    receiving operating system data from the remote information handling system;
    creating a pseudo-device at a specified address of the information handling system;
    performing direct memory access (DMA) remapping between the pseudo-device and an address range of memory of the information handling system to create a ram disk; and
    based on the operating system data received from the remote information handling system, initializing an operating system on the ram disk via the specified address of the pseudo-device.

10. The method of claim 9, wherein the receiving the operating system data is performed in response to an indication of a problem with an installed operating system of the information handling system.

11. The method of claim 9, further comprising preventing access to memory addresses outside of the address range.

12. The method of claim 9, wherein the address range is selected randomly or pseudo-randomly.

13. An article of manufacture comprising a non-transitory, computer-readable medium having computer-executable code thereon that is executable by a processor of an information handling system for:
    during execution of a pre-boot environment of an information handling system by a basic input/output system (BIOS) of the information handling system, establishing a pre-boot network connection to a remote information handling system via a network interface;
    receiving operating system data from the remote information handling system;
    creating a pseudo-device at a specified address of the information handling system;
    performing direct memory access (DMA) remapping between the pseudo-device and an address range of memory of the information handling system to create a ram disk; and
    based on the operating system data received from the remote information handling system, initializing an operating system on the ram disk via the specified address of the pseudo-device.

14. The article of claim 13, wherein the BIOS is a Unified Extensible Firmware Interface (UEFI) BIOS.

15. The article of claim 13, wherein the operating system is a service operating system (SOS).

16. The article of claim 13, wherein the pseudo-device is a Peripheral Component Interconnect (PCI) or Peripheral Component Interconnect Express (PCIe) pseudo-device.

17. The article of claim 16, wherein the address for the pseudo-device is a bus:device:function address.

18. The article of claim 17, wherein the address range of the memory of the information handling system is a physical address range.

19. The article of claim 13, wherein the operating system data is a bootable disk image.

20. The article of claim 13, wherein the DMA remapping is performed via an Advanced Configuration and Power Interface (ACPI) table.

* * * * *

UNITED STATES PATENT AND TRADEMARK OFFICE
CERTIFICATE OF CORRECTION

PATENT NO. : 11,341,250 B2
APPLICATION NO. : 16/571802
DATED : May 24, 2022
INVENTOR(S) : Kumar et al.

It is certified that error appears in the above-identified patent and that said Letters Patent is hereby corrected as shown below:

In the Specification

In Column 6, Line 29, delete "0x080000000 – 0x000000000" and insert
-- 0x080000000 – 0x0C0000000 --, therefor.

Signed and Sealed this
Twenty-ninth Day of November, 2022

Katherine Kelly Vidal
Director of the United States Patent and Trademark Office